INVENTORS.
NICHOLAS J. CAPRON
RICHARD A. FERREN
BY WILLIAM S. BARNHART

ATTORNEY

United States Patent Office 3,197,538
Patented July 27, 1965

3,197,538
STRETCH ORIENTATION OF POLY-
VINYLIDENE FLUORIDE
Nicholas J. Capron, deceased, late of Chalfont, Pa., by Sheila W. Capron, administratrix, Chalfont, Pa., Richard A. Ferren, Ambler, and William S. Barnhart, Lafayette Hill, Pa., assignors to Pennsalt Chemicals Corporation, Philadelphia, Pa., a corporation of Pennsylvania
Filed Oct. 31, 1960, Ser. No. 66,350
3 Claims. (Cl. 264—288)

This invention relates to the orientation by stretching of vinylidene fluoride homopolymers to obtain oriented shapes, such as fibers and films, of high tensile strength.

The orientation by stretching of crystalline high polymers is of course well known. During the stretching or drawing operation the crystallites of the plastic mass which are normally distributed in the polymer in a random fashion become aligned in the direction of the applied stress producing considerable changes in the physical and chemical properties of the polymer. For example, tensile strength in the direction of stress can be greatly increased by this operation. It is known likewise that vinylidene fluoride homopolymers are crystalline in nature and capable of being stretch oriented to improve their properties as is disclosed in U.S. Patent 2,435,537.

It has now been found in accordance with the present invention, that the extent to which homopolymers of vinylidene fluoride may be stretch-oriented, the properties of the oriented polymer, and the ease with which the orientation operation is carried out, depend critically upon the molecular weight of the polymer and the temperature at which the stretch-orientation is performed. Specifically, it has been found that when vinylidene fluoride homopolymers having molecular weights corresponding to plasticity numbers (as herein after defined) of less than 3000 and preferably less than 2500 are stretch-oriented at temperatures in the range of from 100° C. to 145° C. and preferably 115° C. to 135° C., oriented shapes such as fibers, films and the like of very high strengths may be readily obtained. At lower molecular weights and at stretching temperatures outside this range, on the other hand, the stretching operation becomes considerably more difficult to carry out under practicable conditions and the ultimate properties of the oriented polymers are considerably inferior.

Vinylidene fluoride homopolymers, as the term is used herein, includes polymers which consist entirely of repeating units of the formula $[CH_2CF_2]_n$ or which consist essentially of such units with small amounts, up to about five mole percent, of other ethylenically unsaturated comonomers such as ethylene or haloethylenes, e.g. $CFCl=CFCl$, $CF_2=CFCl$, $CF_2=CFH$, or $CF_2=CF_2$.

For use in the present invention, such polymers should have molecular weights corresponding to plasticity numbers of from about 1300 to 3000 and preferably from 1500 to 2500. The "plasticity number" is an empirical index indicating relative molecular weight of the polymer. Because of the difficulty of obtaining a true solution of the polymer, absolute molecular weight determinations have not been possible to obtain. The plasticity number is the area in square millimeters of a plaque made by placing 0.5 gram of polymer powder piled in a cone between the platens of a Carver press heated at 225° C. The platens are brought together to compress the powder under slight pressure (less than 50 lbs./in.$^2$) between the heated platens and the powder is preheated in this manner at 225° C. for 30 seconds. A pressure of 2500 lbs./in.$^2$ is then applied for 60 seconds at a platen temperature of 225° C. The greater the area of the plaques so produced, the lower the molecular weight of the polymer, and conversely.

The preparation of vinylidene fluoride homopolymers is described in U.S. 2,435,537. The polymerization is carried out at elevated temperatures and pressures in the presence of polymerization catalysts, preferably in an aqueous system. Both inorganic peroxy compounds, such as sodium persulfate, preferably in combination with reducing agents such as sodium bisulfite, and organic peroxides such as dibenzoyl peroxide or acetyl peroxide may be employed. An improved polymerization process, which involves the polymerization in the presence of ditertiary butyl peroxide at moderate pressures to give polymers of excellent properties is described in commonly assigned copending application, Serial No. 32,591, filed May 31, 1960, by Murray Hauptschein.

Depending upon the particular polymerization conditions employed, the molecular weight of the polymers produced may vary considerably. Generally speaking, with a given catalyst, higher molecular weight polymers are favored by the use of higher pressures, lower temperatures, and lower catalysts concentrations. In any particular system, the choice of proper conditions to give the desired molecular weight is best determined empirically. In the examples A, B and C which follow, the preparation of polymers of varying molecular weight using a ditertiary butyl peroxide catalyst is illustrated.

EXAMPLE A

A 2 gallon autoclave equipped with a stirrer is charged with 500 milliliters of deionized and deoxygenated water, 10 grams of ammonium perfluorooctanoate, and 20 grams of ditertiary butyl peroxide. The autoclave is heated to a temperature of 110° C. and connected to a source of vinylidene fluoride under a pressure of 550 lbs./in.$^2$. The autoclave is maintained at this pressure for a period of 11 hours while maintaining the autoclave temperature at 110° C.

After the reaction period, the autoclave is cooled, vented and opened. The polymer is vacuum filtered, washed and dried to give a yield of 1093 grams of vinylidene fluoride homoploymer having a plasticity number of 1500.

EXAMPLE B

A 2 gallon autoclave equipped with a stirrer is charged with 400 milliliters of deionized, deoxygenated water, 5 grams of perfluorooctanoic acid, and 20 grams of ditertiary butyl peroxide. The autoclave is connected to a source of vinylidene fluoride at a pressure of 525 to 550 lbs./in.$^2$ and maintained at this pressure for 10 hours while the autoclave and contents are heated to a temperature of 125° C. 614 grams of polymer is obtained having a plasticity number of 2200.

EXAMPLE C

A 2 gallon autoclave equipped with a stirrer is charged with 5000 milliliters of deionized, deoxygenated water, 1 gram of ammonium perfluorooctonate, and 20 grams of ditertiary butyl peroxide. The autoclave is connected to a source of vinylidene fluoride at a pressure of 475 to 500 lbs./in.$^2$ and maintained constant at this pressure for a period of 16½ hours while the autoclave and contents are heated to a temperature of 125° C. 950 grams of polymer is obtained having a plasticity number of 4100.

In Example B, the somewhat higher polymerization temperature resulted in a polymer of somewhat higher plasticity number (and correspondingly lower molecular weight) while in Example C, the combination of a somewhat higher polymerization temperature, a smaller amount of dispersing agent and somewhat lower polymerization pressure resulted in a polymer of still higher plasticity number (and correspondingly lower molecular weight).

For an understanding of the effect of molecular weight and stretching temperature upon the orientation of vinylidene fluoride homopolymers, reference is now made to FIGURES 1 to 4 wherein FIGURE 1 is a stress-strain curve of a specimen of polyvinylidene fluoride film when stretched at a temperature of 100° C.

Figure 1:
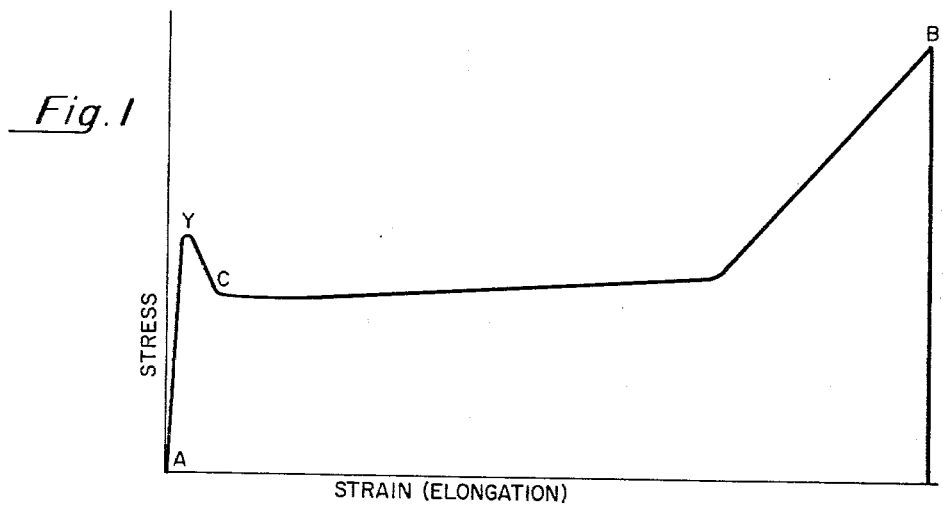
Figure 2A:
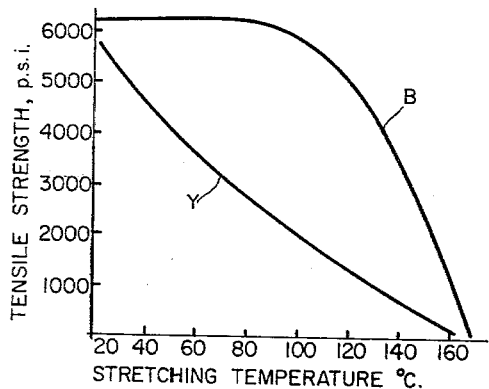
FIGURE 2a is a graph showing the tensile strength at the breaking point and at the yield point of a film specimen of vinylidene fluoride homopolymer as a function of stretching temperature from 20° to 160° C. where the vinylidene fluoride homopolymer has a plasticity number of 1500.
Figure 2B:
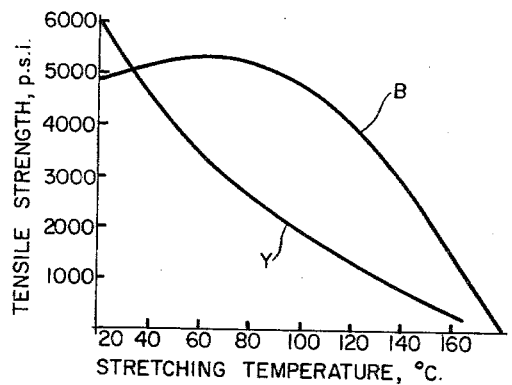
FIGURE 2b is a graph similar to that shown in FIGURE 2a where the vinylidene fluoride homopolymer has a plasticity number of 2200.
Figure 2C:
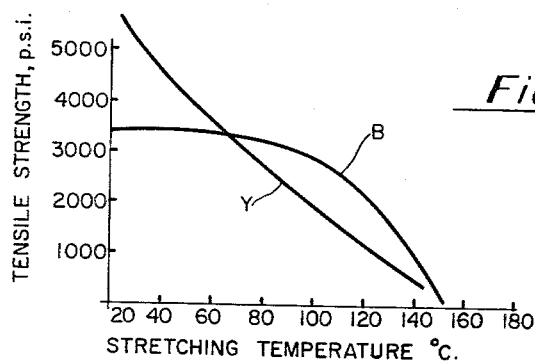
FIGURE 2c is a graph similar to that shown in FIGURE 2a where the vinylidene fluoride homopolymer has a plasticity number of 4100.
Figure 3:
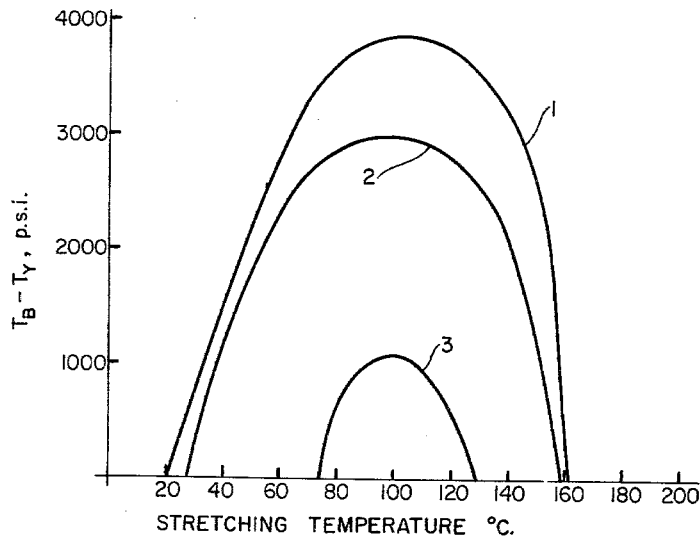
FIGURE 3 is a graph showing the differential between the tensile strength at break and the tensile strength at yield of specimens of polyvinylidene fluoride film of various molecular weights as a function of stretching temperature.

The critical effect of molecular weight upon the orientability of vinylidene fluoride homopolymers is apparent from FIGURES 1 to 3 to which reference is now made. FIGURE 1 shows a typical stress-strain curve obtained when a pressure-molded film specimen 10 mils in thickness, one inch long and one-half inch wide is stretched in the direction of its longer dimension at a temperature of 100° C. The portion A–Y of the curve represents the elastic stretch region wherein permanent elongation of the specimen has not occurred. Point Y is the yield point where irreversible stretching or elongation of the specimen begins to occur. Section Y–C represents the drop-off in stretching force required to further elongate the specimen. Section Y–B of the curve represents the amount of irreversible stretching that occurs before point B which is the breaking point of the specimen. It is apparent from this curve that in order to obtain irreversible elongation of the specimen, point B must lie above point Y, i.e. the force required to break the specimen must exceed that required to cause it to yield. It is likewise apparent that if point B is not sufficiently greater than point Y (i.e. if the breaking strength does not sufficiently exceed the yield strength) the specimen is apt to break before appreciable elongation can occur, requiring that the specimen be stretched with care to avoid breakage.

FIGURES 2a, 2b and 2c show that the differential between breaking and yield strength, which as explained above, is of vital importance in determining the extent and ease of stretch orientation possible, is critically dependent upon the molecular weight of the specimen. In these figures, the curves Y represent the yield strength obtained when drawing film specimens at various temperatures at the rate of 200% per minute. The specimens employed were strips of compression molded film .010 inch in thickness, having a length of 1.00 inch and a width of 0.50 inch. Curves B represent the breaking strength of similar film specimens when stretched at the same rate at various temperatures. FIGURE 2a shows the values obtained with a polymer prepared in accordance with Example A having a plasticity of 1500. The curves in FIGURE 2b show the values obtained using a polymer of the type prepared in accordance with Example B having a plasticity of 2200, while the curves in FIGURE 2c were obtained using a polymer prepared in accordance with Example C having a plasticity of 4100. As is apparent from these curves, the greatest positive difference between the breaking strength and yield strength is obtained with the polymer of highest molecular weight (the polymer of Example A) while the differential between the breaking strength and yield strength for the polymer of Example C is a negative value up to temperatures of 70° C. and is quite low at any stretching temperature.

The effect of molecular weight upon the differential between break and yield strength is also apparent from FIGURE 3 where curves 1, 2 and 3 represent respectively $T_b - T_y$ (breaking strength minus yield strength) for polymers prepared in accordance with Examples A, B and C respectively at various stretching temperatures. It is clearly apparent that for any given stretching temperature, $T_b - T_y$ is much greater for the higher molecular weight polymers and accordingly, the extent and ease of orientation of these higher molecular weight polymers is correspondingly greater. While polymers of somewhat lower molecular weight, such as those having a plasticity of 4100 prepared in accordance with Example C, are considered to be high polymers of excellent properties for many uses, they are not susceptible to stretch orientation under practicable conditions to produce high strength films, fibers and the like.

While the lower limit of molecular weight (upper limit of plasticity number) is determined by the foregoing considerations, there is also an upper limit of molecular weight (lower limit of plasticity number) beyond which it is difficult to prepare the shapes suitable for orientation, e.g. films and filaments. This is due to the higher melt viscosity of the polymer making it difficult to extrude or otherwise mold, and to the lower solubility of the polymer in pseudo solvents making solvent spinning or casting difficult, as the molecular weight increases to high values. For this reason it is preferred to use polymers having plasticity numbers of not less than 1300 and preferably not less than 1500.

Figure 4:
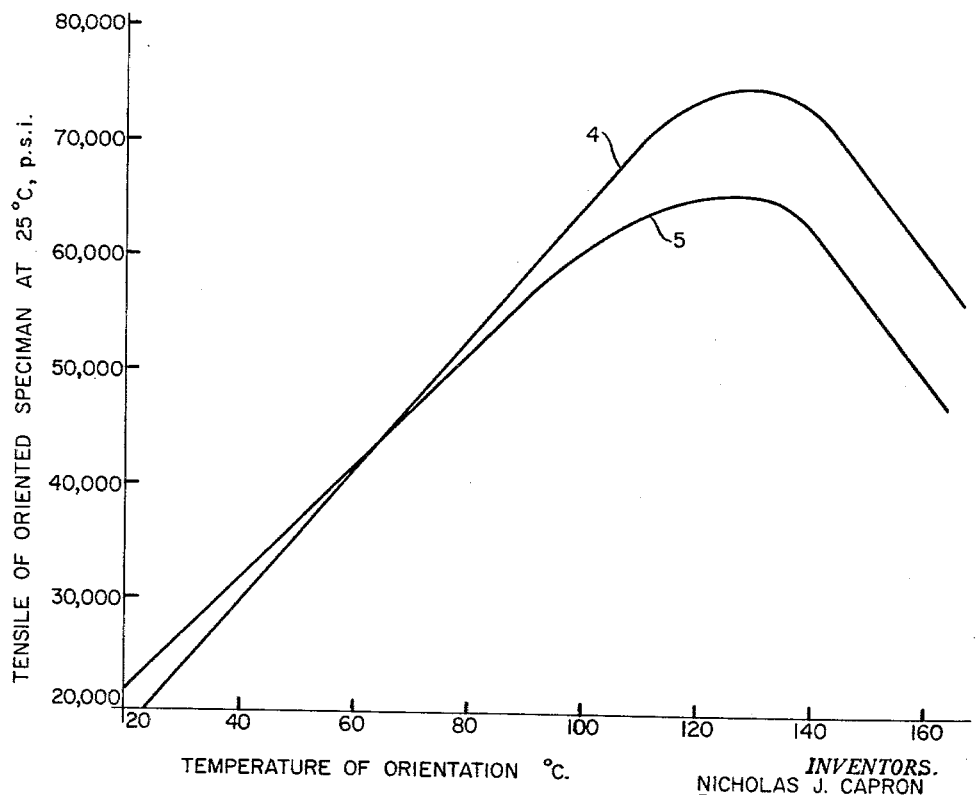
FIGURE 4 is a graph showing the tensile strength of oriented specimens of polyvinylidene fluoride film at 25° C. as a function of the temperature of orientation.

The critical effect of the stretching temperature upon the stretch orientation of the vinylidene fluoride homopolymers is apparent from FIGURES 2 to 4 inclusive. It is apparent from FIGURES 2 and 3 that a maximum differential between break strength and yield strength occurs at a temperature of approximately 100° C. and that for the higher molecular weight polymers (curves 1 and 2) $T_b - T_y$ is relatively high in the region of stretching temperatures from about 80° C. to 145° C. and drops off rapidly at temperatures outside these limits. Thus, it is apparent that the region of about 80° to 135° C. represents the region of stretching temperatures in which the stretch orientation may be carried out at practicable rates with a minimum danger of breakage.

While the maximum differential between break and yield strengths occurs at 100° C., it has been found that maximum tensile strengths of the oriented specimen are obtained at a somewhat higher temperature, namely, a temperature of 130° C., this relationship being shown in FIGURE 4. In FIGURE 4, curve 4 represents the tensile strength at 25° C. of monofilament specimens made from the polymer of Example A which have been stretch-oriented just short of their breaking point at varying temperatures from 25° to 150° C. Curve 5 is a similar curve representing the values obtained when a somewhat lower molecular weight polymer made in accordance with Example B is employed. As may be seen, the maximum strength is obtained for specimens which have been oriented at about 130° C., lower strengths being obtained at stretch orientation temperatures higher and lower than 130° C.

As a result of the foregoing considerations, the optimum stretching temperatures lie within the region of about 100 to 145° C. and preferably in the region of 115° to 135° C. Stretching temperatures below about 100° C. are not desirable because of the considerably lower strengths that are obtained, while stretching temperatures above 145° C. are not desirable since the differential between breaking strength and yield strength is decreasing rapidly at this temperature as shown in FIGURE 3. As previously pointed out, an excessively low differential between breaking and yield strength increases the possibility of frequent breakage during the drawing operation and other difficulties of this nature.

The stretching of the vinylidene fluoride polymer to produce oriented shapes such as films and fibers may be carried out with any of the usual equipment well known in the art. Thus, filaments may be conveniently stretch oriented by drawing between rollers operating at different speeds. Films may be oriented in a similar manner. Where it is desired to impart a two way stretch to the film, the lateral stretch may be imparted on a continuous apparatus using the well-known tenter frames. If desired the first and second stretching of the film may be carried out at the same or different temperatures.

It is highly preferable to carry out the stretch orientation when the polymer is in a relatively amorphous condition—that is, in a condition which displays a low degree of crystallinity relative to the maximum degree of crystallinity which the polymer is capable of developing. The crystallinity of the polymer is influenced chiefly by its past thermal history or rheology. When the polymer is cooled rapidly, i.e. quenched in passing from the liquid to solid state the minimum of crystallinity is developed. Likewise solvent casting of the polymer produces a shape of low initial crystallinity. Slow cooling or reheating of the quenched polymer on the other hand favors the formation of crystallites and will produce a more crystalline polymer. As is well known in the art, the degree of crystallinity of the polymer may be measured by X-ray diffraction techniques.

The undesirable effect of crystallinity is illustrated by comparing specimens of polyvinylidene fluoride film which are relatively amorphous with specimens which are relatively crystalline with respect to $T_b - T_y$, i.e. the differential between tensile-at-break and tensile-at-yield. In one series of experiments for example, $T_b - T_y$ values for two sets of film specimens were obtained, each prepared from three types of polyvinylidene fluoride produced in accordance with Examples A, B, C having respectively plasticity numbers of 1500, 2200 and 4100.

One set of specimens were rapidly quenched after compression molding at about 225° C. thus yielding relatively amorphous film of relatively low crystallinity. The second set of specimens were allowed to cool slowly developing relatively high crystallinity. $T_b - T_y$ values were obtained for all specimens in the manner previously described with the following results:

| Type | $T_b - T_y$ | | |
|---|---|---|---|
| | Plasticity No. 1500 | Plasticity No. 2200 | Plasticity No. 4100 |
| Amorphous | 3,900 | 4,900 | 900 |
| Crystalline | 1,200 | 2,900 | 0 |

The lower $T_b - T_y$ values for the crystalline material increases the difficulty of stretch orientation for the reasons previously explained and furthermore, the crystalline polymers offer more resistance to stretching thus increasing the power requirements for the stretching operation.

Thus, to obtain optimum physical properties in the oriented specimen and to facilitate the orientation operation itself, the polymer during orientation should possess minimum crystallinity such as is produced by rapidly cooling the polymer after it has been shaped from the melt. Thus, melt extruded filaments or films are preferably rapidly cooled, e.g. by an air blast or by quenching in a cool liquid bath immediately after extrusion.

For practical operation, the rate of stretching should range from a minimum of about 20% per minute to a maximum of about 2000% per minute and preferably should be in the range of from 200% to 1000% per minute. The amount of stretch imparted will depend upon the particular properties desired but in general should be at least 75% up to a maximum of about 600%, and preferably in the range of from 100 to 400%.

After the polymer has been stretch oriented, it is preferable to subject it to a heat setting treatment while maintaining the tension to prevent retraction. The heat setting operation is preferably carried out by heating the stretched polymer maintained under sufficient tension to prevent retraction at a temperature higher than the stretch orientation temperature and preferably in the range of from 115° C. to 155° C. for a period of time which may vary e.g. between about 3 and 30 minutes. In the case of filaments, these may be conveniently heat set by winding the stretch oriented filament under tension on a bobbin and then heating the filament on the bobbin at the desired temperature for the proper length of time. The heat setting of the film may be carried out in the well-known manner in a continuous fashion by running the stretched film through an oven where it is passed from roller to roller and maintained under tension to prevent retraction.

The following illustrates the effect of heat setting temperature on the dimensional stability of oriented polyvinylidene fluoride film specimens. Such specimens, made from polymer of plasticity number 2200, were heat set (specimen heated for 15 minutes while maintaining tension to prevent retraction) at temperatures of 150° C., 125° C., 110° C. and 100° C. after which tension was released and samples of each were heated for 30 minutes at 100° C. and 125° C. The results are as follows:

| Heat Set Temp., ° C. | Percent decrease in length when heated (without tension) for 30 minutes at— | |
|---|---|---|
| | 100° C. | 125° C. |
| 150 | 5.2 | 12.3 |
| 125 | 6.2 | 16.6 |
| 110 | 10.9 | 21.5 |
| 100 | 13.2 | 23.9 |

The following examples illustrate the stretch orientation of polyvinylidene fluoride mono-filament in accordance with the invention.

Two batches of polyvinylidene fluoride prepared in accordance with the general procedures of Example A and having plasticity numbers respectively of 2100 and 1800 were extruded at a temperature of 400 to 480° F. through a 0.040 inch diameter round orifice at the rate of 15 feet per minute. The mono-filament was rapidly cooled in air and then taken up on a spool run at substantially the speed of extrusion. The mono-filament was first led over a positively driven godet three inches in diameter and then was led into a heated bath of ethylene glycol 7 feet in length. Idler rolls serve to guide the mono-filaments through the bath. The mono-filament leaving the bath was led over a positively driven second godet three inches in diameter rotating at a faster speed than the first, thus effecting a stretching of the mono-filament in the bath. The stretched filament was then led to a take up spool. Several runs were made at bath temperatures ranging from 75° C. to 125° C. and the tensile strength and elongation at break of the oriented specimens was determined. The results of these runs are shown in Table I.

Table I

| Example No. | Plasticity Number | Orientation Temp., °C. | 1st Godet, r.p.m. | 2d Godet, r.p.m. | Draw Ratio [1] | Tensile Strength, p.s.i. | Percent Elongation at break after orientation |
|---|---|---|---|---|---|---|---|
| 1 | 2100 | 75 | 18 | 76 | 3.80 | 40,000 | 26.3 |
| 2 | 2100 | 75 | 18 | 87 | 4.01 | 38,000 | 25.4 |
| 3 | 2100 | 100 | 14.5 | 88 | 4.23 | 61,000 | 19.9 |
| 4 | 2100 | 100 | 14.5 | 85 | 4.81 | 51,000 | 18.2 |
| 5 | 1800 | 100 | 15 | 76 | 4.95 | 62,000 | 23.0 |
| 6 | 1800 | 100 | 15 | 100 | 5.81 | 68,000 | 28.0 |
| 7 | 2100 | 125 | 16 | 76 | 4.81 | 68,000 | 18.4 |
| 8 | 2100 | 125 | 16 | 104 | 5.43 | 74,000 | 17.1 |
| 9 | 1800 | 125 | 15 | 72 | 5.19 | 59,000 | 28.0 |
| 10 | 1800 | 125 | 15 | 110 | 5.81 | 75,000 | 27.0 |

[1] Ratio of diameters of filament before and after stretching.

As is apparent from the data in the above table, optimum tensile strength was obtained at a stretching temperature of the order of 125° C., the values obtained at this temperature being almost double those obtained at a stretching temperature of 75° C.

It is to be understood that many other variations and embodiments are included within the scope of the invention in addition to those specifically described above; the embodiments described are for the purpose of illustrating and exemplifying the invention and the invention is not limited thereto.

We claim:
1. A method for stretching orienting homopolymers of vinylidene fluoride which comprises the step of stretching a vinylidene fluoride homopolymer having a plasticity number of from about 1500 to 2500 at a temperature of from 100° C. to 145° C.

2. A method for stretch orienting homopolymers of vinylidene fluoride which comprises the step of stretching a vinylidene fluoride homopolymer having a low degree of crystallinity and having a plasticity number of from about 1500 to 2500 at a temperature of from 100° C. to 145° C.

3. A method in accordance with claim 2 in which the oriented polymer is heat-set by maintaining the stretched polymer under sufficient tension to prevent retraction while maintaining it at a temperature higher than the stretch orientation temperature employed.

References Cited by the Examiner

UNITED STATES PATENTS 2,405,008   7/46   Berry et al.
2,767,435   10/56   Alles.
2,953,428   9/60   Hunt et al.
2,984,593   5/61   Isaksen et al.

ALEXANDER H. BRODMERKEL, *Primary Examiner.*

MORRIS LIEBMAN, MICHAEL V. BRINDISI, WILLIAM J. STEPHENSON, *Examiners.*